No. 865,666. PATENTED SEPT. 10, 1907.
C. WENDORFF.
DRIVING CLUTCH FOR AUTOMOBILES.
APPLICATION FILED MAR. 4, 1907.
2 SHEETS—SHEET 1.
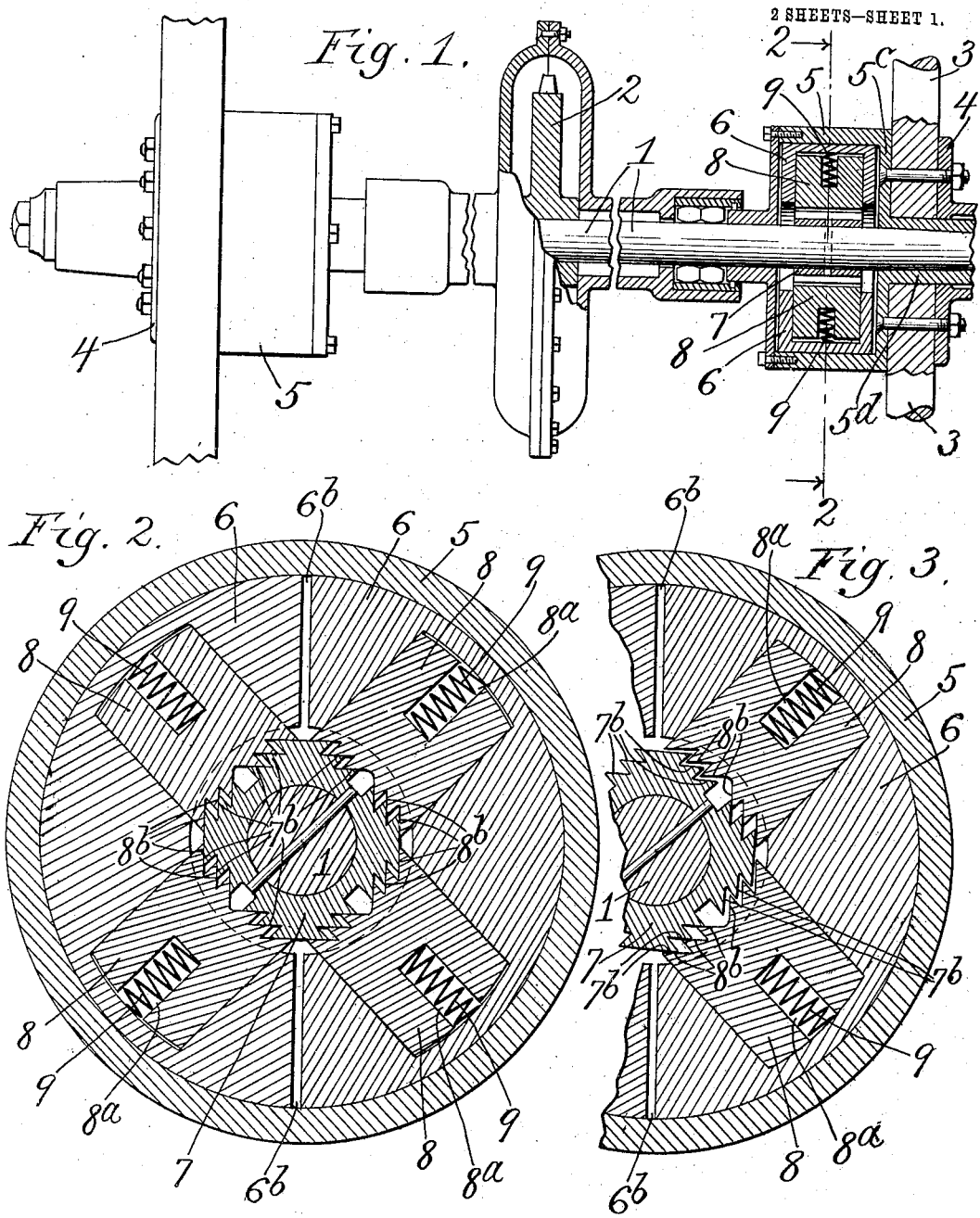
Witnesses.
Edward T. Wray.
J S Abbott
Inventor.
Charles Wendorff.
by Burton & Burton
his Attys.

No. 865,666.  
PATENTED SEPT. 10, 1907.

C. WENDORFF.  
DRIVING CLUTCH FOR AUTOMOBILES.  
APPLICATION FILED MAR. 4, 1907.

2 SHEETS—SHEET 2.

Witnesses:  
Edward T. Wray  
J. S. Abbott

Inventor,  
Charles Wendorff.  
by Burton & Burton  
his Attys.

UNITED STATES PATENT OFFICE.

CHARLES WENDORFF, OF CHICAGO, ILLINOIS.

DRIVING-CLUTCH FOR AUTOMOBILES.

No. 865,666.   Specification of Letters Patent.   Patented Sept. 10, 1907.

Application filed March 4, 1907. Serial No. 360,367.

*To all whom it may concern:*

Be it known that I, CHARLES WENDORFF, a citizen of the United States, residing at Chicago, in the county of Cook and State of Illinois, have invented new and useful Improvements in Driving-Clutches for Automobiles, of which the following is a specification, reference being had to the drawings forming a part thereof.

The purpose of this invention is to provide an improved clutch connecting the wheel of a power-impelled vehicle with the axle in such manner that it may be rotated in either direction by the axle as the power may be applied, and have at the same time capacity for rotating faster than the axle whichever way it is driven, so that in running forward or backing around a curve the outer wheel shall be free to take the greater speed due to the larger curve in which it travels.

It consists of the characteristics, elements and features of construction shown and described, as pointed out in the claims.

Figure 4:
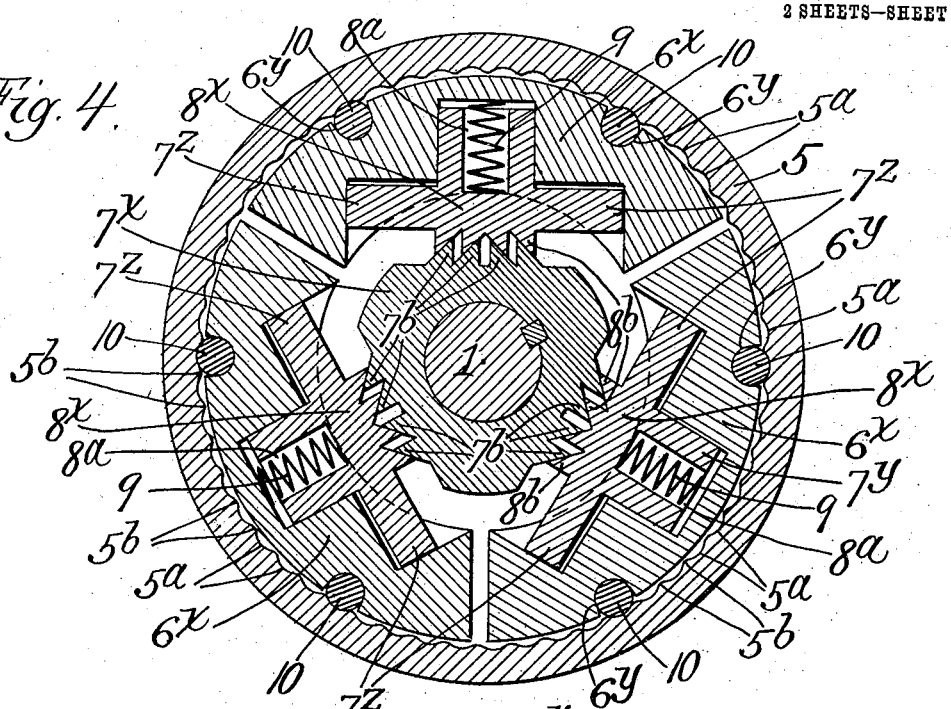
Figure 5:
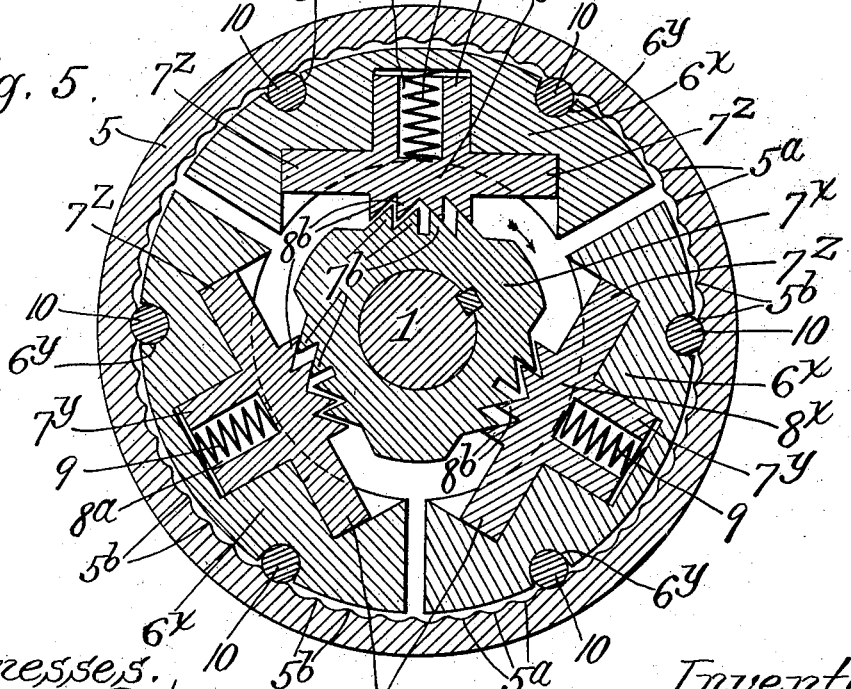

In the drawings:—Figure 1 is a partly sectional plan view of a portion of the axle and wheels of a power-propelled vehicle having the driving connections embodying this invention, section being made axially with respect to the axle through the hub and clutch-driving connections of the wheel. Fig. 2 is a section at the line 2—2 on Fig. 1 showing the parts in position of rest,—that is, when not rotated in either direction. Fig. 3 is a similar view showing the relation of the parts as slightly changed by the rotation of the axle in one direction. Fig. 4 is a view similar to Fig. 2 showing a modification. Fig. 5 is a view similar to Fig. 3 showing the same modification as Fig. 4.

The axle, 1, is rotated by a chain (not shown) from the power shaft of the motor (not shown) passing around the sprocket wheel, 2, on said axle, 1. The wheel comprises a hub portion in which the spokes, 3, are firmly bound between an outer flange, 4, and the side web, $5^c$, of the clutch case, 5, whose cylindrical body constitutes the outer element of the clutch, as will hereinafter appear. The clutch case has a sleeve, $5^d$, forming a bearing on the axle, 1. Coöperating with the outer element, 5, of the clutch there is a two-part inner element consisting of the two half-cylindrical elements, 6, 6, which are adapted to fit snugly within the outer element, 5, but when seated therein to be separated by a slight gap, as seen at $6^b$, so that being drawn together at their diametric faces they are relieved from frictional grip upon the outer clutch element. On the axle, 1, within the clutch case there is fixedly mounted a driving collar, 7, having a plurality of faces, preferably four, corresponding in position to an equal number of plungers, 8, which are lodged two in each of the half cylindrical elements, 6, in which there are formed cavities radial with respect to the axle in which the plungers fit for radial movement. In the outer end of each plunger there is formed a spring pocket, $8^a$, in which is lodged a spring, 9, which reacts between the plunger and the half cylindrical element, 6, for yieldingly forcing the plunger inward, or, conversely, forcing the clutch element, 6, outward against the annular outer clutch element, 5.

The inner end of each plunger, 8, is engaged with one of the faces of the collar, 7, by means of two sets or groups of shoulders, $8^b$, which are oppositely sloped and coöperate with similarly oppositely sloped shoulders, $7^b$, of the collar. The shoulders of the plunger are relatively disposed with respect to the corresponding shoulders of the collar so that perfect engagement of both sets of shoulders of the plunger with the corresponding sets of shoulders on the collar to the full length or depth of the shoulders is not possible. The purpose of this construction is that when the shaft is rotated in one direction, the shoulders on all four faces of the collar having the slope in one direction coöperate with the correspondingly sloped shoulders of the four plungers to force the latter outward, causing them to crowd the half-cylindrical clutch elements, 6, outward firmly into engagement with the annular element, 5, for driving the wheel in the direction in which the shaft is rotated; and if the shaft is rotated in the opposite direction the same result follows from the similar engagement of the oppositely sloped sets of shoulders of the collar with the correspondingly oppositely sloped sets of shoulders of the four plungers. It will be seen, also, that in whichever direction the shaft is rotating and thereby driving the wheel, a more rapid rotation of the wheel in the same direction will relax the engagement of the operative or driving sets of sloping shoulders, thus releasing the engagement between the two clutch members, so that this engagement does not prevent the more rapid rotation or over-travel of the wheel in respect to the shaft in the same direction in which the shaft is rotating, whichever direction that may be, and this is the purpose of the invention.

In Figs. 4 and 5 there is shown a modification consisting in part in making the inner element of the clutch in three segments instead of two, each segmental clutch element, $6^x$, being recessed at the inner side to receive a modified plunger, $8^x$, having opposite facing shoulders, $8^b$, corresponding to the similarly indicated shoulders of the other form facing the shoulders, $7^b$, on the triangularly shaped driving collar, $7^x$, which in this form takes the place of the collar, 7, of the other form. Besides the change of number of the parts from two to three, this modification differs from the other form in that the plungers have a reduced stem, $7^y$, for guidance in the correspondingly reduced socket in the segmental clutch element, and operate outwardly against said clutch element for pressing it outward by means of the shoulder, $7^z$, instead of operating as in the other form, by their full end against a comparatively thin remnant of the diameter of the clutch element. The advantage of this change is the avoidance of the reduction of the strength of the clutch element to such an extent as it is reduced by the large sockets formed for the full dimensions of the plunger in the first form. The modification under consideration (Figs. 4 and 5) is fully distinguished from the other form by making the inner circumference of the outer clutch element or casing, 5, scalloped, as shown, in these figures; or,—to state the construction more accurately,— consisting of a succession of concave seats, 5ª, with the intervening projections, 5ᵇ, preferably slightly rounded, and in forming each of the segmental clutch elements, 6ˣ, with two concave recesses or seats, 6ʸ, in which are lodged rollers or loose cylindrical abutments, 10, 10, which project or protrude beyond the periphery of the clutch element so as to project into and occupy the recesses, 5ª. The depth of the recesses, 5ª, is not greater than the range of radial play of the clutch elements, 6, so that in case of overspeed of the wheel as compared with the axle tending to rotate the outer clutch element or casing, 5, relatively to the inner clutch element, 6ˣ, the roller abutments, 10, are crowded back out of their seats in the recesses, 5ª, the projections, 5ᵇ, riding over the rollers which immediately recover their seated position in the next succeeding recesses. The action of this construction is that in case of over-travel the clutch elements, 6ˣ, are immediately taken out of frictional engagement with the outer clutch element or casing, 5, so that there is no possibility of the clutch being locked by such over-travel, as by the rotation of the axle in the reverse direction.

I claim:—

1. In a power-driven vehicle in combination with the axle and the wheel journaled on the axle, an outer annular clutch element rigid with the hub; an inner clutch element consisting of a plurality of parts, each adapted for seating outwardly against the inner surface of the outer annular element; a collar fast on the shaft within the inner clutch elements; plungers lodged for radial movement in the said inner clutch elements; springs reacting between said plungers and said inner clutch elements for holding the latter yieldingly outward relatively to the plunger the plungers having at their inner ends oppositely sloping shoulders and the collar having correspondingly oppositely sloping shoulders for coöperating with the plungers respectively.

2. In a power-driven vehicle in combination with the axle and the wheel journaled on the axle, an outer annular clutch element rigid with the hub; an inner clutch element comprising two half cylindrical parts adapted each to seat against the inner surface of the annular clutch element and having slight play within said inner element, each of said half-cylindrical parts having two radial pockets opening inwardly and plungers lodged in said pockets for radial movement; springs reacting between the plungers and said clutch parts for forcing the plungers relatively inward and the clutch parts outward; a collar fast on the axle within the clutch elements having faces corresponding to the inner ends of the two plungers in each inner clutch part, each of said faces having two sets of shoulders oppositely sloped, the inner ends of the plungers having two corresponding sets of oppositely sloped shoulders for coöperating with the shoulders of the collar respectively.

3. In a power-driven vehicle, in combination with the axle and the wheel journaled thereon, an outer annular element rigid with the hub; an inner clutch element consisting of a plurality of parts, each adapted for seating outwardly toward the inner surface of the outer annular element; a collar fast on the shaft within the inner clutch element; plungers lodged for radial movement in the respective parts of said inner clutch element; springs reacting between said plungers and said clutch parts for holding the latter yieldingly outward, the plungers having at their inner ends oppositely sloping shoulders and the collar having correspondingly oppositely sloping shoulders for coöperating therewith, the inner circumference of the outer clutch element being provided with a multiplicity of concave seats or recesses, rendering it corrugated or scalloped, each of the several parts of the inner clutch element being provided with a plurality of abutments taking into said recesses or seats of the outer element adapted to be disengaged therefrom by the inward yielding of said clutch parts when the outer element is actuated for rotation relatively to the inner element.

4. In a power-driven vehicle, in combination with the axle and the wheel journaled thereon, an outer annular element rigid with the hub; an inner clutch element consisting of a plurality of parts each adapted for seating outwardly toward the inner surface of the outer annular element; a collar fast on the shaft within the inner clutch element; plungers lodged for radial movement in the respective parts of said inner clutch element; springs reacting between said plungers and said clutch parts for holding the latter yieldingly outward, the plungers having at their inner ends oppositely sloping shoulders, and the collar having correspondingly oppositely sloping shoulders for coöperating therewith, the inner circumference of the outer clutch element being provided with a multiplicity of concave seats or recesses rendering it corrugated or scalloped, each of the several parts of the inner clutch element having lodged in its outer periphery two rollers presenting a small protruding segment for seating in the recesses of said outer clutch element and adapted to disengage therefrom by the inward yielding of the said inner clutch parts when the outer clutch element is actuated for rotation relatively to the inner.

5. In a power-driven vehicle, in combination with the axle and the wheel journaled thereon, clutch devices for connecting the axle and wheel, comprising an outer clutch element and an inner clutch element having a plurality of parts each adapted to yield inward toward the axle; means on the axle for crowding them outward by rotation of the axle, the outer clutch element being interiorly scalloped or corrugated, each of the inner clutch parts having two rollers lodged in its periphery and protruding a small segment therebeyond for seating in the scalloped recesses or corrugations of the outer element.

In testimony whereof, I have hereunto set my hand at Chicago, Illinois, this 27 day of February, 1907.

CHARLES WENDORFF.

Witnesses:
 LOUIS EISENSTADT,
 CHAS S. BURTON.